(12) United States Patent
Laws

(10) Patent No.: US 6,529,445 B1
(45) Date of Patent: Mar. 4, 2003

(54) METHOD OF REDUCING EFFECTS OF A ROUGH SEA SURFACE ON SEISMIC DATA

(75) Inventor: Robert Laws, Cambridge (GB)

(73) Assignee: Schlumberger Technology Corporation, Ridgefield, CT (US)

( * ) Notice: Subject to any disclaimer, the term of this patent is extended or adjusted under 35 U.S.C. 154(b) by 0 days.

(21) Appl. No.: 09/936,745

(22) PCT Filed: Mar. 21, 2000

(86) PCT No.: PCT/GB00/01066

§ 371 (c)(1),
(2), (4) Date: Feb. 15, 2002

(87) PCT Pub. No.: WO00/57206

PCT Pub. Date: Sep. 28, 2000

(30) Foreign Application Priority Data

Mar. 22, 1999 (GB) ................................ 9906456

(51) Int. Cl.$^7$ ................................................ G01V 1/36
(52) U.S. Cl. .......................................... 367/151; 702/14
(58) Field of Search .................. 702/14, 16; 367/21–24, 367/151

(56) References Cited

U.S. PATENT DOCUMENTS

| | | | |
|---|---|---|---|
| 2,757,356 A | 7/1956 | Haggerty | 367/24 |
| 4,353,121 A | 10/1982 | Ray et al. | 367/21 |
| 4,979,150 A | 12/1990 | Barr | 367/24 |
| 5,293,352 A | * 3/1994 | Chambers | 367/38 |
| 5,521,881 A | * 5/1996 | Lau et al. | 367/24 |
| 5,587,965 A | * 12/1996 | Dragoset, Jr. et al. | 367/24 |
| 5,696,734 A | 12/1997 | Corrigan | 367/24 |
| 6,101,448 A | * 8/2000 | Ikelle et al. | 702/17 |

FOREIGN PATENT DOCUMENTS

| | | | |
|---|---|---|---|
| EP | 0 365 270 A2 | 4/1990 | G01V/1/36 |
| GB | 2 333 364 A | 7/1999 | G01V/1/36 |
| WO | 91/13373 A1 | 9/1991 | G01V/1/38 |

OTHER PUBLICATIONS

Pierson, W J and Moskowitz, L A Proposed Spectral Form for Fully Developed Wind Seas Based on the Similarity Theory of S A Kitaigorodskii, Journal of Geophysical Research, vol. 69, No. 24, Dec. 1964, pp. 5181–5190.

Hasselmann, D E, Dunckel, M and Ewing J A, Directional Wave Spectra Observed during JONSWAP 1973, Journal of Physical Oceanography, vol. 10, 1980, pp. 1264–1280.

(List continued on next page.)

Primary Examiner—Edward Lefkowitz
Assistant Examiner—Victor J. Taylor
(74) Attorney, Agent, or Firm—William L. Wang; William B. Batzer; John J. Ryberg

(57) ABSTRACT

A method of correcting seismic data for the effects of a rough sea surface is disclosed. Corrections for the effect of a rough sea surface are made by determining the time-dependent height of the sea surface, either by direct measurement or by calculation from the seismic data. A deconvolution operator is generated from the measured or calculated height of the sea surface and is used to reduce or eliminate the effects of the rough sea surface. Once the data has been corrected for the effect of the rough sea surface, it can be processed in any way suitable for processing seismic data obtained in flat sea conditions.

12 Claims, 10 Drawing Sheets

OTHER PUBLICATIONS

Jovanovich, D B, Sumner, R D and Akins–Easterlin, S L, Ghosting and marine signature deconvolution: A prerequisite for detailed seismic interpretation, Geophysics, vol. 48, No. 11, Nov. 1983, pp. 1468–1485.

Dragoset, B, Hargreaves, N and Larner, K, Air–gun source instabilities, Geophysics, vol. 52, No. 9, Sep. 1987, pp. 1229–1251.

Lainiotis, D G, Plataniotis, K and Charalampous, C Adaptive filter applications to heave compensation, Proceedings of the Oceans Conference, New York, IEEE, 1992, pp. 277–282.

Luhurbudi, E C, Pulliam, J, Austin, J A, Saustrup, S and Stoffa, P L, Removal of diurnal tidal effects from an ultra–high–resolution 3–D marine seismic survey on the continental shelf offshore New Jersey, Geophysics, vol. 63, No. 3, May–Jun. 1998, pp. 1036–1040.

White, J E, Composite Detector at the Interface, Seismic waves: radiation, transmission and attenuation, McGraw–Hill, 1965, pp. 42–43.

\* cited by examiner

METHOD OF REDUCING EFFECTS OF A ROUGH SEA SURFACE ON SEISMIC DATA

FIELD OF THE INVENTION

The present invention relates to the field of reducing the effects of surface ghost reflections in seismic data obtained in a fluid medium. In particular, the invention relates to a method of correcting for the effects of a rough sea surface on marine seismic data.

BACKGROUND OF THE INVENTION

FIG. 1 is a schematic diagram showing reflections between a sea surface (S), sea floor (W) and a target reflector (T). Various events that will be recorded in the seismogram are shown and are labelled according to the series of interfaces they are reflected at. The stars indicate the seismic source and the arrowheads indicate the direction of propagation at the receiver. Events ending with 'S' were last reflected at the rough sea surface and are called receiver ghost events. Down-going sea-surface ghost reflections are an undesirable source of contamination, obscuring the interpretation of the desired up-going reflections from the earth's sub-surface.

Removing the ghost reflections from seismic data is for many experimental configurations equivalent to up/down wavefield separation of the recorded data. In such configurations the down-going part of the wavefield represents the ghost and the up-going wavefield represents the desired signal.

Ghost reflections from the sea surface will occur in all sea conditions. Rough seas are a further source of noise in seismic data. Aside from the often-observed swell noise, further errors are introduced into the reflection events by ghost reflection and scattering from the rough sea surface. The rough sea perturbed ghost events introduce errors that are significant for time-lapse seismic surveying and the reliable acquisition of repeatable data for stratigraphic inversion.

The effect of the rough sea is to perturb the amplitude and arrival time of the sea surface reflection ghost and add a scattering coda, or tail, to the ghost impulse. The impulse response can be calculated by finite difference or Kirchhoff methods (for example) from a scattering surface which represents statistically typical rough sea surfaces. For example, a directional form of the Pierson-Moskowitz spectrum described by Pierson, W. J. and Moskowitz, L., 1964 'A proposed Spectral Form for Fully Developed Wind Seas Based on the Similarity Theory of S. A. Kitaigorodskii' J. Geo. Res., 69, 24, 5181–5190, (hereinafter "Pierson and Moskowitz (1964)"), and Hasselmann, D. E., Dunckel, M. and Ewing, J. A., 1980 'Directional Wave Spectra Observed During JONSWAP 1973', J. Phys. Oceanography, v10, 1264–1280, (hereinafter "Hasselmann et al, (1980)"). Both the wind's speed and direction define the spectra. The Significant Wave Height ("SWH") is the subjective peak to trough wave amplitude, and is about equal to 4 times the RMS wave height. Different realisations are obtained by multiplying the 2D surface spectrum by Gaussian random numbers.

FIG. 2 shows an example of rough sea impulses along a 400 m 2D line (e.g. streamer) computed under a 2 m SWH 3D rough sea surface. The streamer shape affects the details of the impulses, and in this example the streamer is straight and horizontal. FIG. 2 shows, from top to bottom: The ghost wavelet (white trough) arrival time, the ghost wavelet maximum amplitude, a section through the rough sea realisation above the streamer, and the computed rough sea impulses. The black peak is the upward travelling wave, which is unperturbed; the white trough is the sea ghost reflected from the rough sea surface. The latter part of the wavelet at each receiver is the scattering coda from increasingly more distant parts of the surface. Notice that the amplitude and arrival time ghost perturbations change fairly slowly with offset. The arrival time perturbations are governed by the dominant wavelengths in the sea surface, which are 100–200 m for 2–4 m SWH seas, and the amplitude perturbations are governed by the curvature of the sea surface which has an RMS radius of about 80 m and is fairly independent of sea state. The diffraction coda appear as quasi-random noise following the ghost pulse.

The rough sea perturbations cause a partial fill and a shift of the ghost notch in the frequency domain. (The "ghost notch" is a minimum in the spectrum caused by destructive interference between the direct signal and the ghost signal). They also add a small ripple to the spectrum, which amounts to 1–2 dB of error for typical sea states. In the post stack domain this translates to an error in the signal that is about −20 dB for a 2 m SWH sea.

FIG. 3 shows an example of how such an error can be significant for time-lapse surveys. The panel on the top left shows a post-stack time-migrated synthetic finite difference seismic section. The top middle panel shows the same data but after simulating production in the oil reservoir by shifting the oil water contact by 6 m and introducing a 6 m partial depletion zone above this. The small difference is just noticeable on the black leg of the reflection to the right of the fault just below 2 s two-way travel-time. The panel on the right (top) shows the difference between these two sections multiplied by a factor of 10. This is the ideal seismic response from the time-lapse anomaly.

The left and middle bottom panels show the same seismic sections, but rough sea perturbations for a 2 m SWH (as described above) have been added to the raw data before processing. Note that different rough sea effects are added to each model to represent the different seas at the time of acquisition. The difference obtained between the two sections is shown on the bottom right panel (again multiplied by a factor of 10). The errors in the reflector amplitude and phase (caused by the rough sea perturbations) introduce noise of similar amplitude to the true seismic time-lapse response. To a great extent, the true response is masked by these rough sea perturbations. A method for correcting these types of error is clearly important in such a case, and with the increasing requirement for higher quality, low noise-floor data, correction for the rough sea ghost becomes necessary even in modest sea states.

Exact filters for up/down separation of multi-component wavefield measurements in Ocean Bottom Cable (OBC) configurations have been derived by Amundsen and Ikelle, and are described in U.K. Patent Application Number 9800741.2. A normal incidence approximation to the de-ghosting filters for data acquired at the sea floor was described by Barr, F. J. in U.S. Pat. No. 4,979,150, issued 1990, entitled 'System for attenuating water-column reflections', (hereinafter "Barr (1990)"). For all practical purposes, this was previously described by White, J. E., in a 1965 article entitled 'Seismic waves: radiation, transmission and attenuation', McGraw-Hill (hereinafter "White (1965)"). However, these prior art techniques require measurements of both velocity and pressure. Moreover, they do not completely correct the complex reflections from rough sea surfaces, and a satisfactory method for eliminating or reducing the effects of a rough sea surface on seismic data is required.

SUMMARY OF THE INVENTION

The present invention provides a method of reducing the effects in seismic data of downwardly propagating reflected and/or scattered seismic energy travelling in a fluid medium, the method comprising the steps of:

a) obtaining seismic data using a seismic source and a seismic receiver disposed within the fluid medium;

b) determining the height of at least one portion of the surface of the fluid medium as a function of time; and c) processing the seismic data using the results of the determination of the height of the surface of the fluid medium to correct for variations in the height of the fluid medium. Thus, the present invention provides a method of correcting for the effects of a rough sea surface on marine seismic data. Moreover, in contrast to the prior art techniques mentioned above, the invention requires only a measurement of the height of the sea surface.

The portion of the sea surface of which the height is measured may be located over the seismic source or over the seismic receiver. The height of the sea surface may be measured at only a single point above the seismic source, or the height of a region of the sea surface above the source may be measured. Alternatively, if the receiver is a streamer the height of the sea surface may be measured at a plurality of points along the streamer.

The height of the sea surface may be directly measured, for example by suitable sensors provided on the seismic source or on the seismic receiver. Alternatively, the height of the sea surface may be determined from the acquired seismic data.

DETAILED DESCRIPTION OF THE INVENTION

Figure 1:
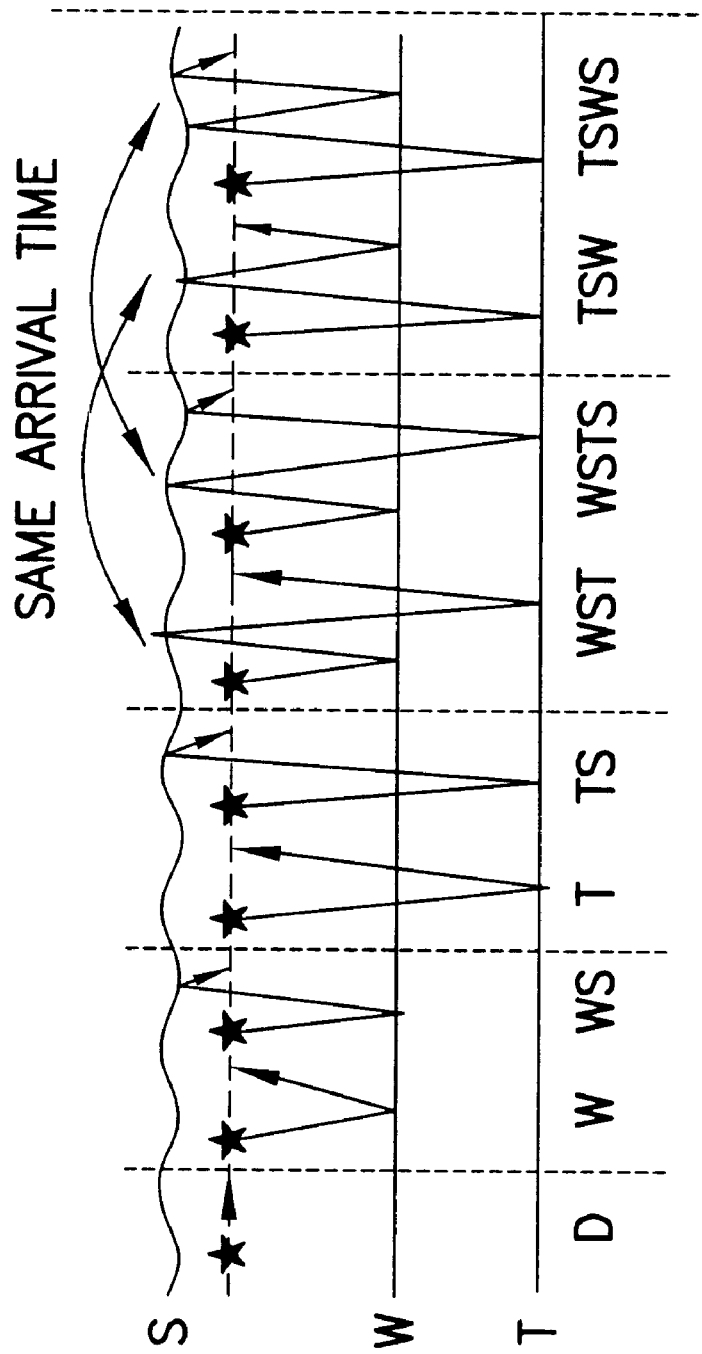
FIG. 1 shows examples of simple seismic ray paths for primary events, and ghosts that are last reflected from the rough sea-surface.
Figure 2:
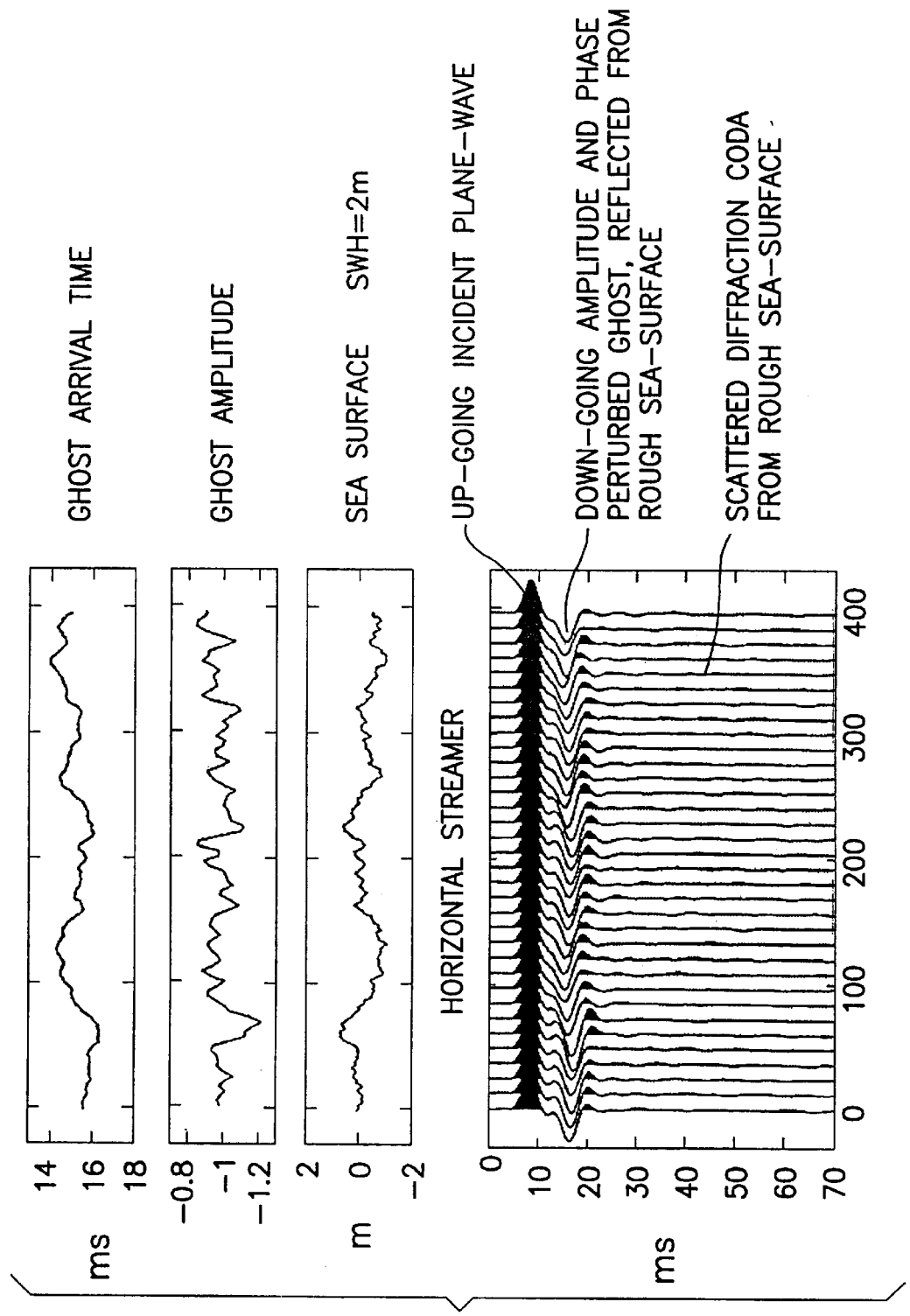
FIG. 2 illustrates the potential impact of 3D rough sea surface ghost reflection and scattering on consistency of the seismic data waveform.
Figure 3:
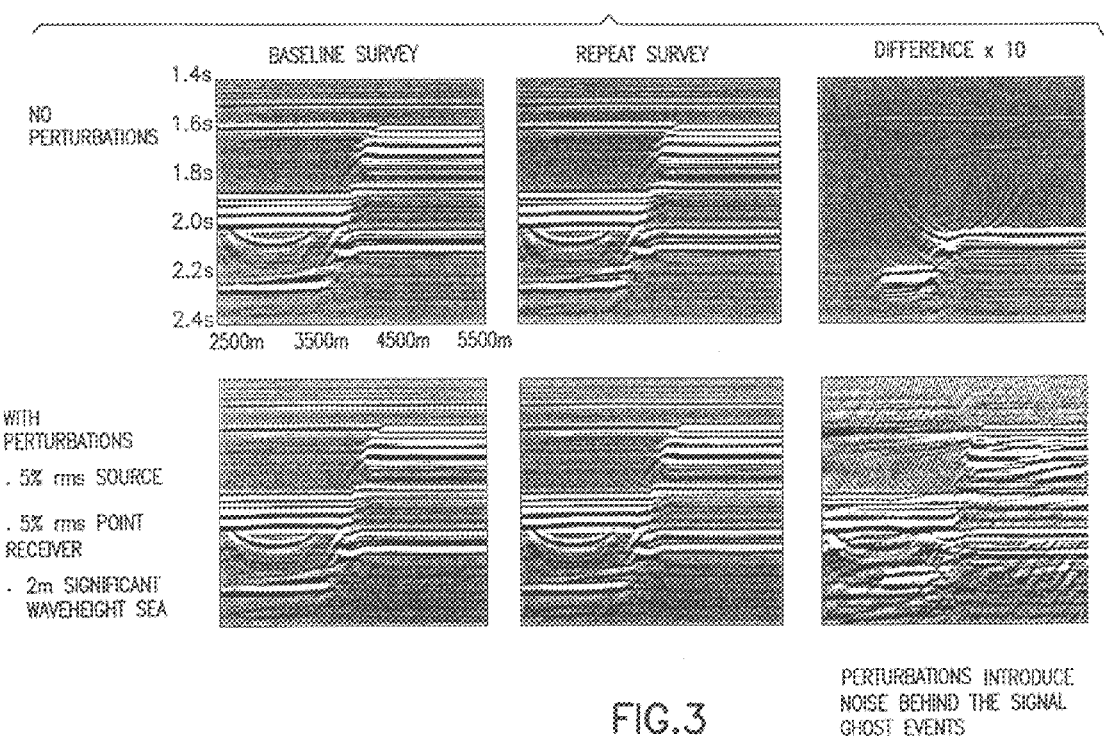
FIG. 3 illustrates the potential impact of the rough sea surface ghost perturbation on time-lapse seismic data quality.

In the present invention, the effect of a rough sea surface on the seismic data is corrected for by determining the variations in the height of a portion of the sea surface as a function of time. The time-dependent variations in the height of the portion of the sea surface can be directly measured, or they can be calculated from the seismic data. The measured or calculated variations in the height of the portion of the sea surface are used during processing of the seismic data to reduce or eliminate the effects of the variations in the height of the sea surface on the processed data. More formally, a deconvolution operator is developed from the time-varying height of the portion of the sea surface and the seismic data is operated on by this operator.

The present invention enables the effects of the rough sea to be removed or at least reduced during the processing of the seismic data. The data obtained in rough sea conditions is thus converted, to a reasonable approximation, into data that was effectively acquired in flat sea conditions. Once the effects of the rough sea surface have been removed, the seismic data can be further processed as if it were data that had been acquired in flat sea conditions. The further processing of the data after correcting for the rough sea surface effects may include a step of de-ghosting the data to eliminate the effects of reflections from the sea surface, although this is not always necessary.

It is possible to extrapolate from the measured or calculated heights of the sea surface, to estimate the time-dependent shape of the sea surface away from the region of the sea surface where the height measurements or calculations were obtained. It has been found that this extrapolation provides useful results up to well over 100 m from the region where the height measurements were obtained.

Once the time-dependent height of the sea surface has been measured or calculated and the results have been extrapolated to estimate the time-dependent height of the sea surface away from the region where measurements or calculations were made, the time-dependent rough sea response function is calculated from the time-dependent height of the sea surface. This can be done by any suitable method such as, for example, Kirchoff integration. A deconvolution operator for eliminating the effects of the time-dependent height of the sea surface is then calculated, and is applied to the seismic data to correct for the effects of the time-dependent height of the sea surface.

In an embodiment in which the height of the sea surface is measured directly, the portion of the sea surface of which the height is measured is preferably located either over the seismic source or over the seismic receiver. Thus, the height of the sea surf ace is measured at one point only or over a small area (if the measured portion is located over the seismic source) or essentially along a line of points (if the measured portion is located over a streamer). In consequence, the angular distribution of the measured sea surface will not be correct. It has been found, however, that, although the angular distribution of the measured sea surface is not correct, it is possible to derive a response function that is sufficiently accurate to enable the errors remaining after deconvolution to be less than 0.5 dB in amplitude and 3.6° in phase.

If the seismic source is a streamer, the method requires that the streamer is provided with a plurality of depth sensors distributed along its length, to allow the height of the sea surface at a plurality of points above the streamer to be determined over time (a streamer generally remains at a substantially constant height above the sea bed). A conventional streamer is provided with one or more depth sensors, for monitoring the depth of the streamer. These conventional depth sensors are, however, relatively insensitive, and are intended just to give an indication that the streamer is approximately level and is keeping at a constant height. The conventional sensors are unable to determine the time-varying shape of the sea surface with the accuracy required by the present invention, for two reasons.

Firstly, the conventional depth sensors on a streamer are too widely spaced to provide a record of the profile of the sea surface that is sufficiently accurate for the method of this embodiment of the invention. The invention requires that the height of the sea surface is measured at lateral intervals of around 5m, to obtain a sufficiently accurate measurement of the height of the sea surface (the height of the sea surface is preferably measured within 5 to 10 m of each receiver). In conventional streamers, however, the spacing between adjacent sensors is much greater than this, being typically 200 m.

Secondly, the depth sensors on a conventional streamer are filtered to too low a bandwidth to be of use in the present invention. The conventional depth sensors provided on a streamer are hydrostatic depth sensors, and these can detect frequencies of up to around 0.02 Hz. There is then a dead-band in the recorded data between 0.02 Hz to about 3 Hz, which is the lowest detected frequency of hydrophones. However, sea surface waves occupy the frequency band of around 0.05 Hz–0.5 Hz, so that the depth sensors provided on a conventional streamer are unsuitable for detecting the profile of the sea surface with the accuracy required to put the present invention into effect.

In order to put into practice an embodiment of the present invention in which the height of the sea surface above a streamer is measured, the streamer must be provided with sensors capable of measuring the height of the sea surface. Each sensor must be able to measure the height to within an accuracy of approximately 5–10 cm, and must be sensitive in the 0.05 Hz–0.5 Hz waveband range. A suitable sensor is a pressure sensor or an acoustic echo depth sensor. The sensors are spaced out along the length of the streamer, preferably at regular intervals. In operation, each sensor measures the height of the sea surface above the sensor either continuously or at discrete intervals, and the results of the measurements made by the sensors are transmitted to a computer or other data recorder and are stored for use in the data processing.

As an alternative to making measurements of the height of the sea surface at a plurality of points disposed along a line, for example along a line over a streamer, the measurements of the height of the sea surface can be made over a region above the seismic source. This can be thought of as measuring the height of the sea surface through an aperture, with results being obtained only for portion of the sea surface "visible" through the aperture.

If the area of a seismic source is small, and a seismic source may have an area of around only 15 metres square, it may well be sufficient to measure the height of the sea surface at only a single point above the seismic source. This can be thought of as measuring the height of the sea surface through a point aperture. When the height of the sea surface is measured at only a single point it is still possible to carry out the extrapolation step described above to estimate the time-dependent height of the sea surface away from the point at which the measurements were made. Although the estimate is poor in appearance, the deconvolution operator derived from the estimate is found to be accurate.

In an embodiment in which the height of a region of the sea surface above the seismic source is measured, the region over which the height of the sea surface is measured is preferably circular, and also is preferably centred over the seismic source. This introduces symmetry, and simplifies the processing. In principle, however, apertures having other shapes could be used. The region over the source in which height measurements are taken preferably has a dimension of the order of metres. For example, a circle having a radius of around 7.5 metres can be used.

Where the height of the sea surface is measured not at a single point but through an aperture having finite dimensions, in practice the height of the sea surface is not measured at every point within the aperture. A two-dimensional array of depth sensors is used to measure the height of the sea surface at a plurality of points within the aperture, for example at 6 or 8 points. Provided that the sensors are spaced closely enough, for example with the distance between adjacent sensors being in the range of 5–10 m, there is no significant loss of accuracy in the subsequent processing of the data. As in the example above, each sensor measures the height of the sea surface at a point above the seismic source either continuously or at discrete intervals, and the results of the measurements made by the sensors are transmitted to a computer or other data recorder and are stored for use in the data processing.

A seismic source is generally suspended from a float. One convenient way of measuring the height of the sea surface at a point above a seismic source is to mount a sensor on the float to record the height of the float. One suitable sensor for this is a GPS receiver.

Figure 5:
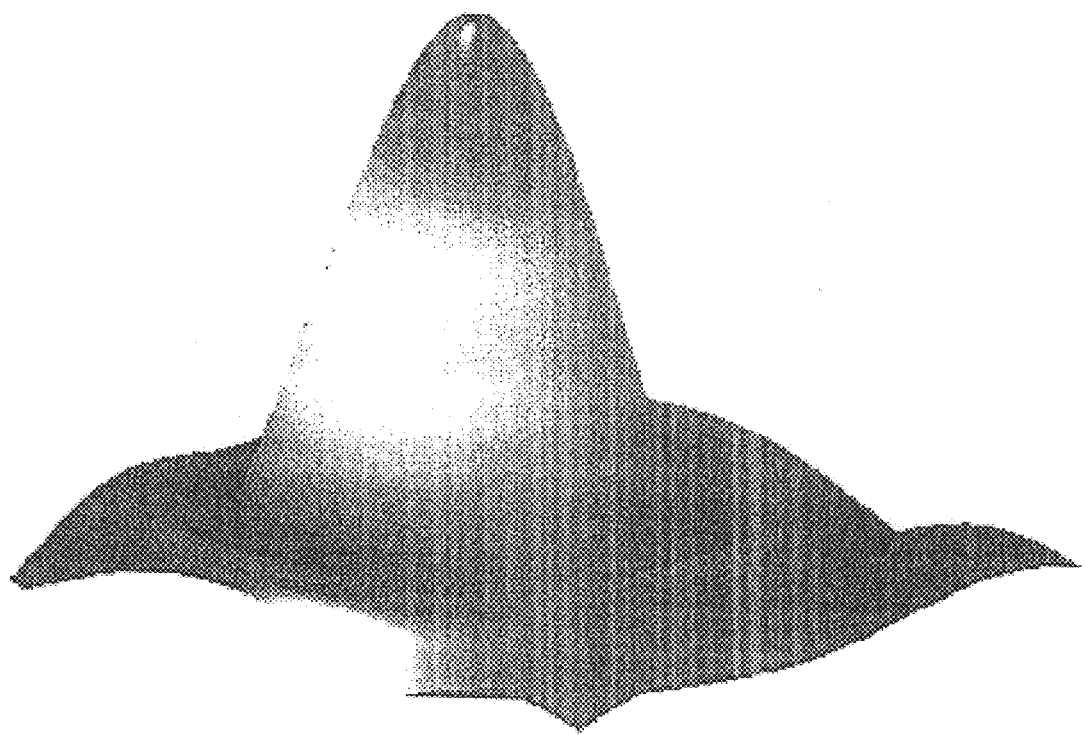
FIG. 5 shows the spread function obtained by measuring the height of the sea surface through a circular aperture.

If the measurements of the height of the sea surface are made through a circular aperture centred above the seismic source, then this aperture in the x–y domain (assuming that the sea surface extends in the x-direction and the y-direction, with the wave height extending in the z-direction) will become a convolution in kx–ky with a point spread function (PSF) that is a cylindrical Bessel function, as shown in FIG. 5. The PSF will obscure much of the fine detail of the sea surface spectrum, and this is equivalent to saying that the aperture through which the height measurements are made is inadequate to describe fully the shape of the sea surface. The first zero crossing of the PSF is at about kB=0.5 radians/meter, where kB is the radial variable of the Bessel function. Each sample of wave spectrum will be spread over a region of radius kB.

The height of the sea surface is measured only for a discrete region of the sea surface over the seismic source and, as noted above, this leads to a loss of resolution in the spectrum. However, according to the present invention, the height of the sea surface is measured over time, and this measurement over time provides extra information that compensates for the loss of resolution caused by the small aperture through which the height data are acquired.

If the recorded height data were filtered so that only one angular frequency, w, is considered at any one time, the real spectrum should then lie entirely on a circle in the wave-number domain with a radius k given by:

$$k = c(w)/w \qquad (1)$$

In equation (1), c(w) is the speed of surface waves having an angular frequency w.

The PSF will spread each sample on this circle over a nearby region having radius kB. The exact shape of the angular spread function is k-dependent, and has the form of a complete circle at low wavenumbers and has the form of an arc at larger wavenumbers. This corresponds to the lack of directional information being mainly at long surface wavelengths.

Figure 6:
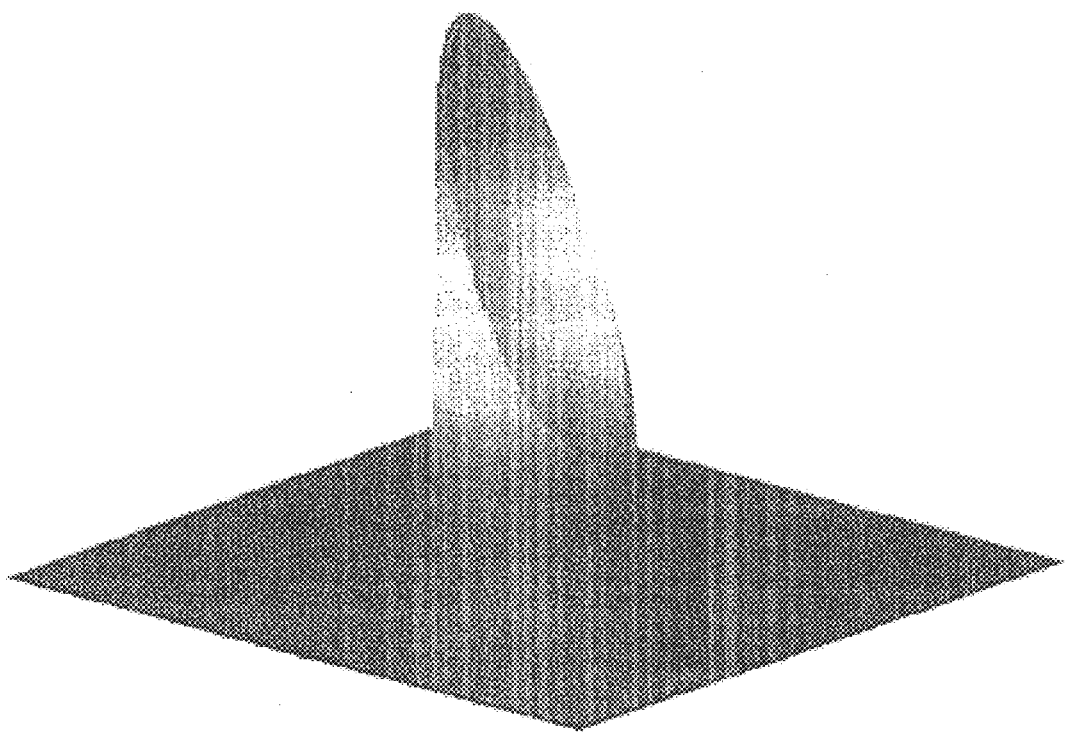
FIG. 6 shows the residual spread function obtained from the spread function of FIG. 5.

It is straightforward to deconvolve the radial spreading of a single frequency component of the data. The values are simply moved back radially onto the circle having radius $k=c(w)/w$. This procedure can be repeated for each temporal frequency in the spectrum of the sea surface. The residual spread function for a sample at (kx, ky) is thus the arc of intersection of a circle having radius k centred on the origin with a circular region of radius kB centred on (kx, ky). An example of the resultant spread function is shown in FIG. 6.

At wavelengths that are very short compared with the dimensions of the aperture through which the height measurements are made, the aperture is large enough that the direction of the waves is estimated reasonably well. However, there is very little energy at these short wavelengths. Most of the energy of the surface wave is at wavelengths that are longer than the dimensions of the aperture through which height measurements are made, and surface waves having these wavelengths cannot be directly measured over a full wavelength. Instead, these waves are estimated from the time dependence of the height of the sea surface. This gives a good estimate of the amplitude of the wave, but a poor estimate of its direction. When the waves are reconstructed, this poor estimation of the direction of long wavelength waves means that the reconstructed wave surface generally has circular symmetry. Only at the very centre of the reconstructed surface, where the measurements were made, does any life-like detail appear.

It might initially appear that a reflection response calculated from a reconstructed wave surface that has such poor angular resolution would have little if any relation to the true response. The inventors have found however that it is in fact possible to derive a good reflection response from the reconstructed waveform surface. This is because the amplitude and phase of the waves in the estimated waveform surface are correct, because they were derived from height measurements taken over time. The vertical response at a time t involves an integral over the surface at a radius t/c (where c is the speed of sound in water), so that the directional error in the spectrum of the surface waves is less significant. Indeed, if the response were purely linear in the height then the response would be exactly correct. The off-vertical response will be more sensitive to the directional error in the reconstructed surface waveform, because the integration wave paths are not circles. However, at typical radiation angles used in seismic exploration the error is acceptable.

Figure 7:
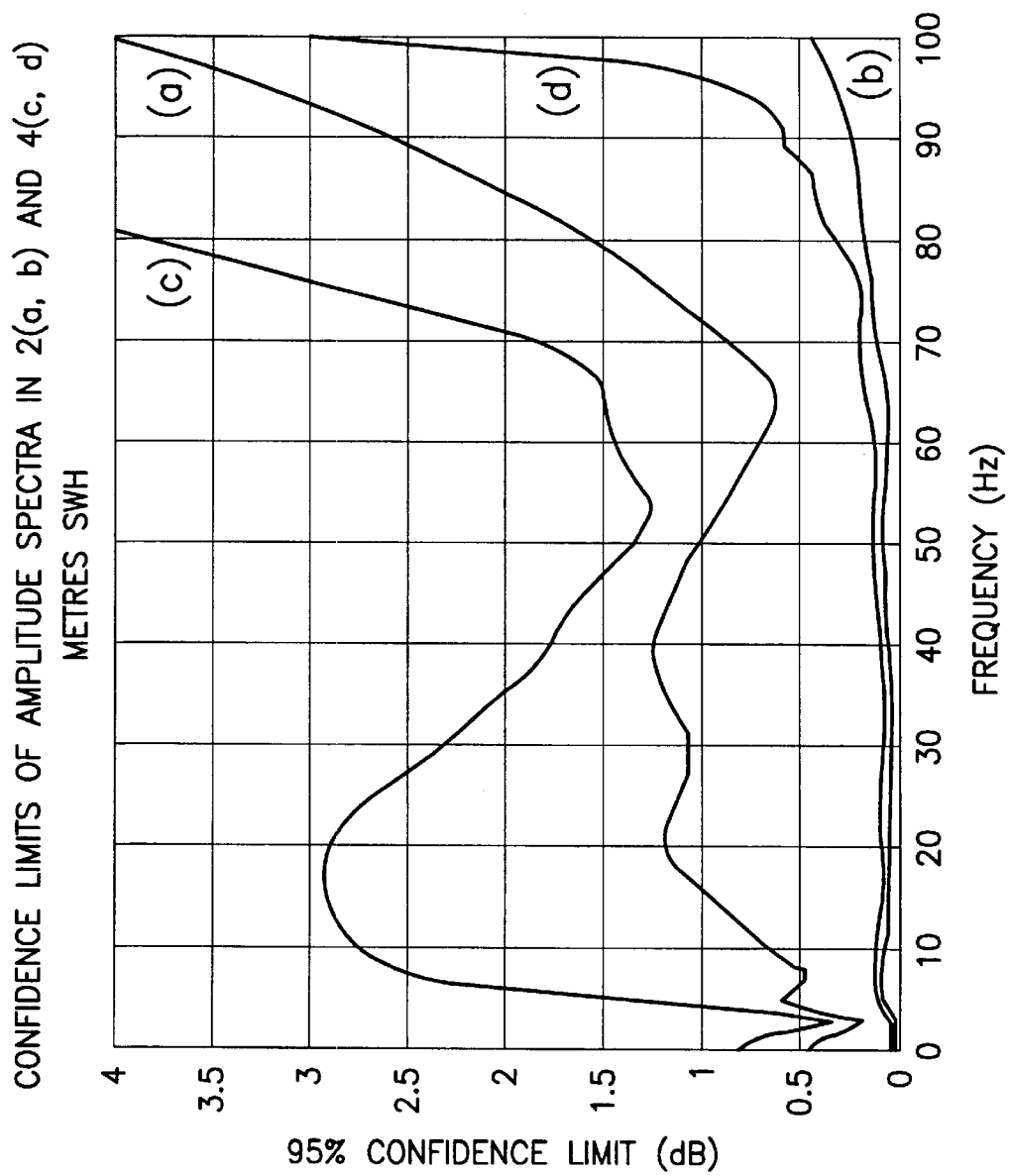
FIG. 7 shows the amplitude of the ghost spectra before and after correction for the rough sea surface above the source according to a method of the present invention.

FIGS. 7 to 10 show examples of how effective the method of the present invention is in reducing the 95% confidence error-bars on the spectra of receiver and source ghosts for seismic data obtained in rough sea conditions. FIG. 7 shows the results of correcting for a rough sea surface by taking height measurements above the source. Trace (a) shows the amplitude of the ghost spectrum obtained for a rough sea surface having a 2 m SWH, and trace (b) shows the result of correcting trace (a) for the rough sea surface using the method described above. Trace (c) corresponds to trace (a) but was obtained for a rough sea surface having a 4 m SWH, and trace (d) shows the result of correcting trace (c) for the rough sea surface using the method described above.

Figure 8:
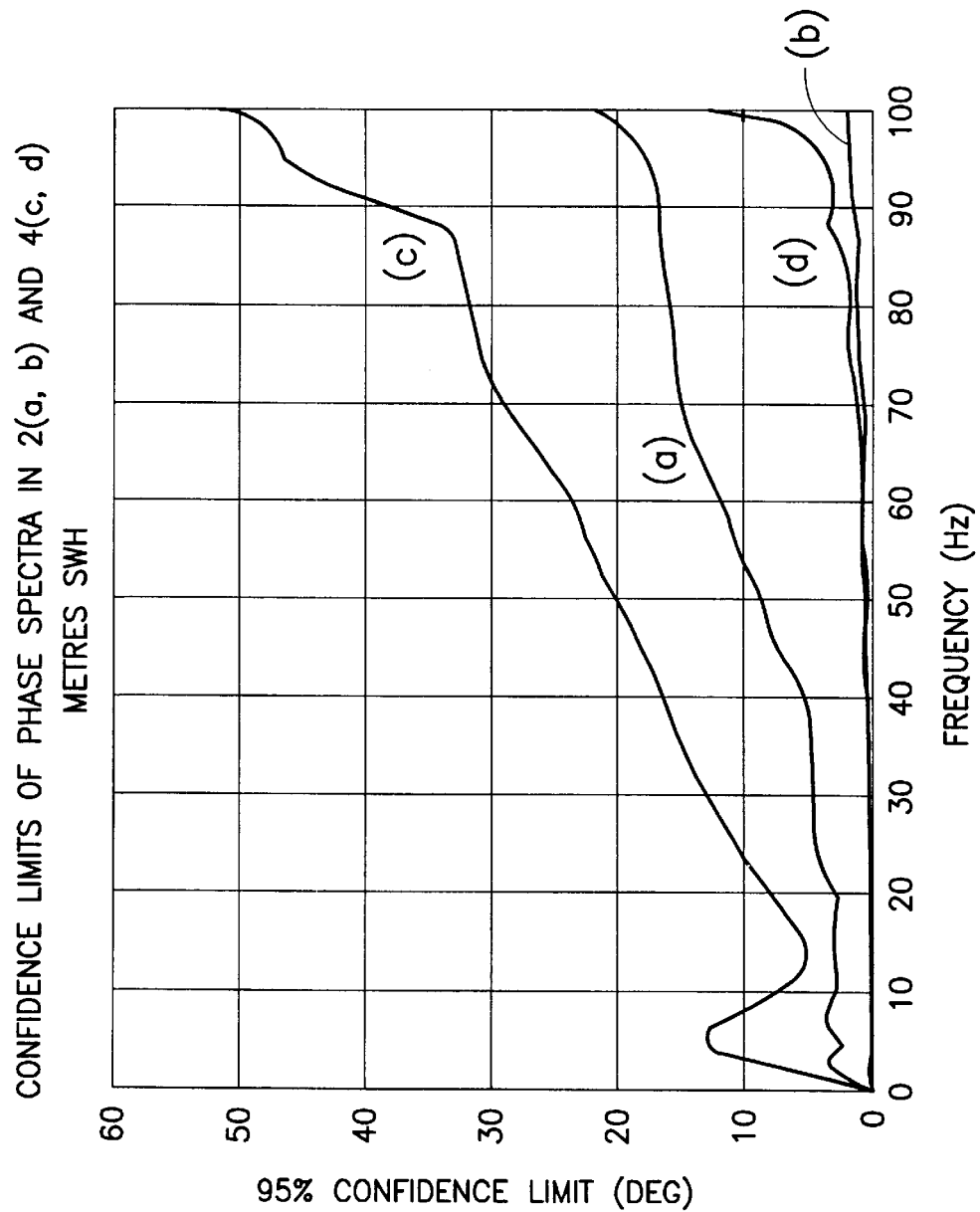
FIG. 8 shows the phase of the ghost spectra before and after correction for the rough sea surface above the source according to a method of the present invention.

FIG. 8 corresponds to FIG. 7, but shows the effect of correcting for the rough sea surface on the phase of the ghost spectrum. Traces (a) and (b) were obtained for a sea having a 2 m SWH and traces (c) and (d) were obtained for a sea having a 4 m SWH.

Figure 9:
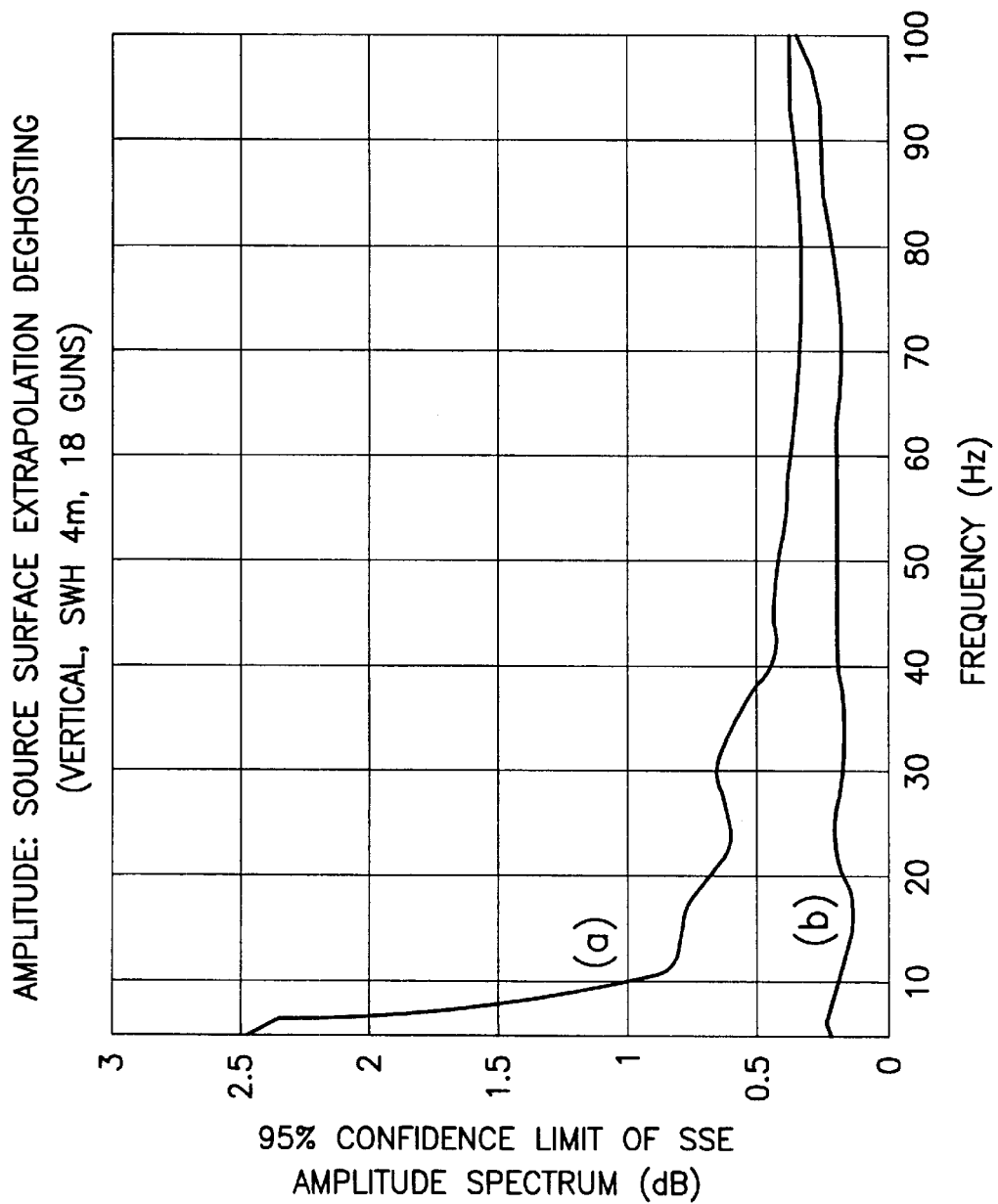
FIG. 9 shows the amplitude of the ghost spectra before and after correction for the rough sea surface above the receiver according to a method of the present invention.
Figure 10:
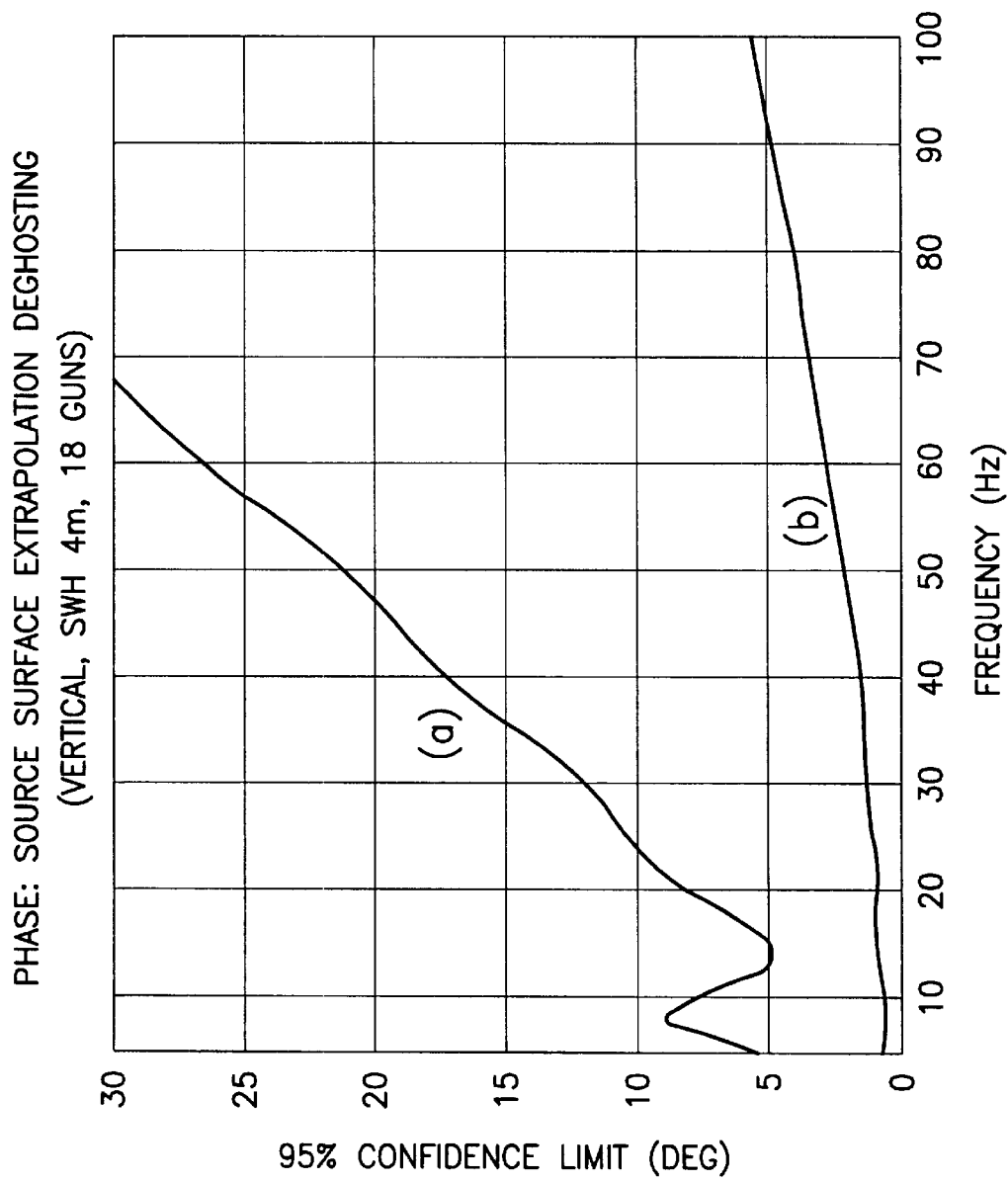
FIG. 10 shows the phase of the ghost spectra before and after correction for the rough sea surface above the receiver according to a method of the present invention.

FIGS. 9 and 10 show the results of a correction based on taking height measurements above the receiver on the amplitude (FIG. 9) and the phase (FIG. 10) of the ghost spectrum. In each of FIGS. 9 and 10, trace (a) shows data obtained in a sea with a 4 m SWH and trace (b) shows the result of correcting for the rough sea surface using the method described above.

In the embodiments described above, the height of the sea surface has been directly measured, by means of suitable depth sensors provided on the source or on the receiver. In a modification of this embodiment of the invention, the height of the sea surface is not measured directly but is estimated from the acquired seismic data. Although the spectrum of the height of the sea surface lies in the dead band of the seismic data acquisition system, as noted above, it is nevertheless captured indirectly. This is because some attributes of the seismic data (such as, for example, the ghost notch frequency), which vary with time over the trace, have a low frequency limit which is lower than the low frequency limit of the acquired data itself. This occurs because the attributes are not linear functions of the data. For example, if a statistical method is developed for rough sea de-ghosting in which the time shifts for direct and ghost events are estimated from the data (using prior information on correlations derived from the sea state), these data could be used as the input to the surface reconstruction and deconvolution method described above.

In the embodiment described above, the steps of measuring or calculating the height of a portion of the sea surface, extrapolating to estimate the height of other portions of the sea surface, calculating the time-dependent rough sea response, and determining the deconvolution operator have been described separately for clarity. In principle, however, it is possible to combine one or more these steps into a single processing stage. For example, the step of calculating the time-dependent rough sea response could be combined with the extrapolation step.

Figure 4:
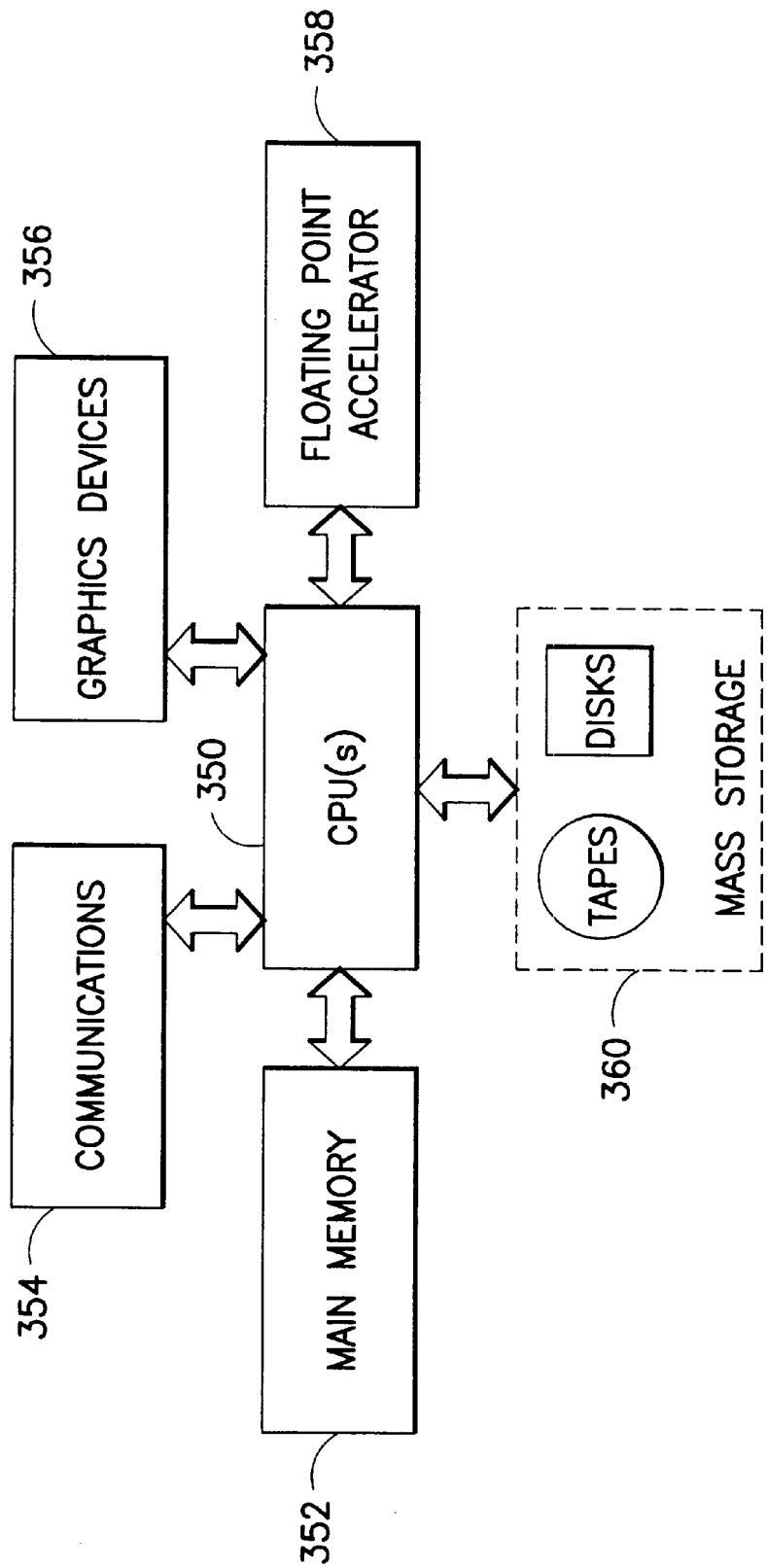
FIG. 4 schematically illustrates an example of a data processor that can be used to carry out preferred embodiments of the invention.

The method of correcting data obtained with a rough sea surface using measurement of the height of the sea surface can be carried out using any conventional seismic data processing system. The processing is preferably performed on a data processor configured to process large amounts of data. For example, FIG. 4 illustrates one possible configuration for such a data processor. The data processor typically consists of one or more central processing units 350, main memory 352, communications or I/O modules 354, graphics devices 356, a floating point accelerator 358, and mass storage devices such as tapes and discs 360.

While preferred embodiments of the invention have been described, the descriptions and figures are merely illustrative and are not intended to limit the present invention. For example, the only seismic receiver referred to in the description of the preferred embodiments of the invention is a streamer. The invention can however be applied to other receivers such as, for example, a vertical receiver array.

What is claimed is:

1. A method of reducing the effects in seismic data of downwardly propagating reflected and/or scattered seismic energy travelling in a fluid medium, the method comprising the steps of:
   a) obtaining seismic data using a seismic source and a seismic receiver disposed within the fluid medium;
   b) determining the height of at least one portion of the surface of the fluid medium as a function of time; and
   c) processing the seismic data using the results of the determination of the height of the surface of the fluid medium to correct for variations in the height of the fluid medium.

2. A method as claimed in claim 1 wherein step (c) comprises calculating a deconvolution operator from the results of the determination of the height of the surface of the fluid medium, and applying the deconvolution operator to the seismic data.

3. A method as claimed in claim 2 wherein step (c) comprises calculating the sea surface response function from the time-dependent height of the sea surface, and calculating the deconvolution operator from the sea surface response function.

4. A method as claimed in claim 3 and further comprising estimating the time-dependent height of a further portion of the sea surface from the results of step (b) before calculating the sea surface response function.

5. A method as claimed in claim 1 wherein step (b) comprises measuring the height of the at least one portion of the surface of the fluid medium.

6. A method as claimed in claim 5 wherein step (b) comprises measuring the height of the surface of the fluid medium at one or more points.

7. A method as claimed in claim 6 wherein the seismic receiver is a streamer and step (b) comprises measuring the height of the surface of the fluid medium at a plurality of points located along the length of the streamer.

8. A method as claimed in claim 6 wherein step (b) comprises measuring the height of the surface of the fluid medium at a single point located along above the seismic source.

9. A method as claimed in claim 5 wherein step (b) comprises measuring the height of the surface of the fluid medium over an area of the surface of the fluid medium.

10. A method as claimed in claim 9 wherein step (b) comprises measuring the height of the surface of the fluid medium over an area that is substantially circular.

11. A method as claimed in claim 10 wherein step (b) comprises measuring the height of the surface of the fluid medium over an area that is substantially centred over the seismic source.

12. A method as claimed in claim 1 wherein step (b) comprises calculating the height of the surface of the fluid medium as a function of time from the seismic data.

* * * * *